(12) United States Patent
Mizuno et al.

(10) Patent No.: US 9,716,289 B1
(45) Date of Patent: Jul. 25, 2017

(54) SOLID-PHASE MAGNESIUM BORANYL ELECTROLYTES FOR A MAGNESIUM BATTERY

(71) Applicants: Toyota Motor Engineering & Manufacturing North America, Inc., Erlanger, KY (US); Karlsruhe Institute of Technology, Eggenstein-Leopoldshafen (DE)

(72) Inventors: Fuminori Mizuno, Ann Arbor, MI (US); Rana Mohtadi, Northville, MI (US); Oscar Tutusaus, Ann Arbor, MI (US); Maximilian Fichtner, Eggenstein-Leopoldshafen (DE); Zhiron Zhao-Karger, Eggenstein-Leopoldshafen (DE)

(73) Assignees: Toyota Motor Engineering & Manufacturing North America, Inc., Erlanger, KY (US); Karlsruhe Institute of Technology, Eggenstein-Leopoldshafen (DE)

( * ) Notice: Subject to any disclaimer, the term of this patent is extended or adjusted under 35 U.S.C. 154(b) by 0 days.

(21) Appl. No.: 15/332,684

(22) Filed: Oct. 24, 2016

Related U.S. Application Data

(60) Provisional application No. 62/277,639, filed on Jan. 12, 2016.

(51) Int. Cl.
*H01M 10/05* (2010.01)
*H01M 10/0562* (2010.01)
*H01M 10/054* (2010.01)

(52) U.S. Cl.
CPC ..... *H01M 10/0562* (2013.01); *H01M 10/054* (2013.01); *H01M 2300/0068* (2013.01)

(58) Field of Classification Search
None
See application file for complete search history.

(56) References Cited

U.S. PATENT DOCUMENTS

| | | | |
|---|---|---|---|
| 8,318,354 B2 * | 11/2012 | Muldoon | H01M 4/134 429/188 |
| 2013/0022875 A1 * | 1/2013 | Tojigamori | H01M 4/581 429/231.5 |
| 2013/0316249 A1 | 11/2013 | Higashi et al. | |
| 2014/0038037 A1 | 2/2014 | Mohtadi et al. | |
| 2015/0229000 A1 * | 8/2015 | Shao | H01M 10/054 429/317 |

OTHER PUBLICATIONS

Higashi, S.; Miwa, K.; Aoki, M.; Takechi, K. Chem. Commun. 2014, 50, 1320 Nano Energy, Dec. 31, 2014, hup://dx.doi.org/10.1016/j.nanoen.2014.12.028.

\* cited by examiner

*Primary Examiner* — Scott J Chmielecki
(74) *Attorney, Agent, or Firm* — Christopher G. Darrow; Darrow Mustafa PC

(57) ABSTRACT

A solid-phase electrolyte is provided having a magnesium salt. The salt contains a magnesium cation and a boron cluster anion and can include an ether or other weakly-coordinating molecule in dative interaction with the magnesium cation. A magnesium electrochemical cell is also provided. The magnesium electrochemical cell includes the solid-phase electrolyte, and also includes an anode in ionic communication with the solid-phase electrolyte. The anode, when charged, contains reduced magnesium.

12 Claims, 3 Drawing Sheets

SOLID-PHASE MAGNESIUM BORANYL ELECTROLYTES FOR A MAGNESIUM BATTERY

CROSS-REFERENCE TO RELATED APPLICATION

This application claims the benefit of U.S. Provisional Application No. 62/277,639, filed Jan. 12, 2016, which is incorporated by reference in its entirety.

TECHNICAL FIELD

The present disclosure is directed in part to an electrochemical cell having a solid-phase magnesium electrolyte. The present disclosure is also directed to a method for making such an electrolytic cell.

BACKGROUND

Magnesium batteries have received significant attention as potential replacements for lithium batteries due to their high volumetric capacity, lack of dendrite formation, and the relative inexpensiveness of magnesium. Discovery and development of suitable electrolytes for magnesium batteries has proven challenging however. Conventional inorganic magnesium salts have typically been found incompatible with reversible magnesium deposition as they tend to form an ion-blocking layer at the magnesium electrode during their electrochemical reduction. On the other hand, organic magnesium salts such as those derived from Grignard reagents have been found to be highly corrosive, particularly toward non-noble cathodes, possibly due to the presence of chloride co-anions.

Previous studies have shown that magnesium borohydride and related magnesium boron cluster salts are effective as liquid electrolytes in magnesium batteries, possessing high compatibility with metal and the versatility to function with a variety of magnesium-compatible cathodes. In virtually all such systems studied to date, the electrolyte has been present as an ethereal solution, as ethers are the only solvents known to be compatible with magnesium.

The use of solid electrolytes generally has several advantages relative to comparable liquid electrolytes, including but not limited to a direct increase in energy density of the battery. A small number of solvent-free, or solid magnesium electrolytes have been reported. However, the known solid magnesium electrolytes generally have insufficient magnesium mobility to be practical in a magnesium battery at a desirable operating temperature.

SUMMARY

The present disclosure provides an electrochemical cell having a solid electrolyte, and a method for fabricating a magnesium electrochemical cell having a solid-phase magnesium electrolyte.

In an aspect, an electrochemical cell is provided having an anode and a cathode. The electrochemical cell further includes a solid electrolyte in contact with at least one of the anode and the cathode, the solid electrolyte including a boron cluster salt having a formula:

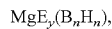

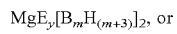

a combination thereof, wherein E is a magnesium ligand; y is within a range of 0 through 6, inclusive; n is within a range of 6 through 12, inclusive; and m is within a range of 5 through 11, inclusive.

In another aspect, a method for fabricating an electrochemical cell is provided. The method includes a step of preparing a magnesium boron cluster salt by a process that includes: (i) contacting an organic boron cluster salt with a magnesium salt in the presence of a solvent or mixture of solvents; and (ii) producing a precipitate that comprises the magnesium boron cluster salt. Or alternatively, the boron cluster salt mixture is prepared as described in US patent application no. US20140154592 A1, by Mohtadi et. al. The magnesium boron cluster salt has a formula:

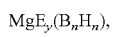

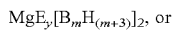

a combination thereof, wherein E is a magnesium ligand; y is within a range of 0 through 6, inclusive; n is within a range of 6 through 12, inclusive; and m is within a range of 5 through 11, inclusive. The method additionally includes a step of placing the magnesium boron cluster salt in ionic communication with an anode and a cathode.

In yet another aspect, an electrochemical half-cell is disclosed, having an electrode configured to absorb elemental magnesium during electrochemical reduction, to release cationic magnesium during electrochemical oxidation, or both. The electrochemical half-cell further has a solid-phase magnesium electrolyte in ionic communication with the electrode, the solid-phase magnesium electrolyte comprising cationic magnesium and at least one boron cluster anion.

These and other features of the electrochemical cell having a solid-phase magnesium electrolyte, and the method for making the same, will become apparent from the following detailed description when read in conjunction with the figures and examples, which are exemplary, not limiting.

BRIEF DESCRIPTION OF THE DRAWINGS

For a better understanding of the processes and devices having a solid-phase magnesium electrolyte, with regard to the particular variations and examples discussed herein, reference is made to the accompanying figures, in which.

DETAILED DESCRIPTION

Figure 1:
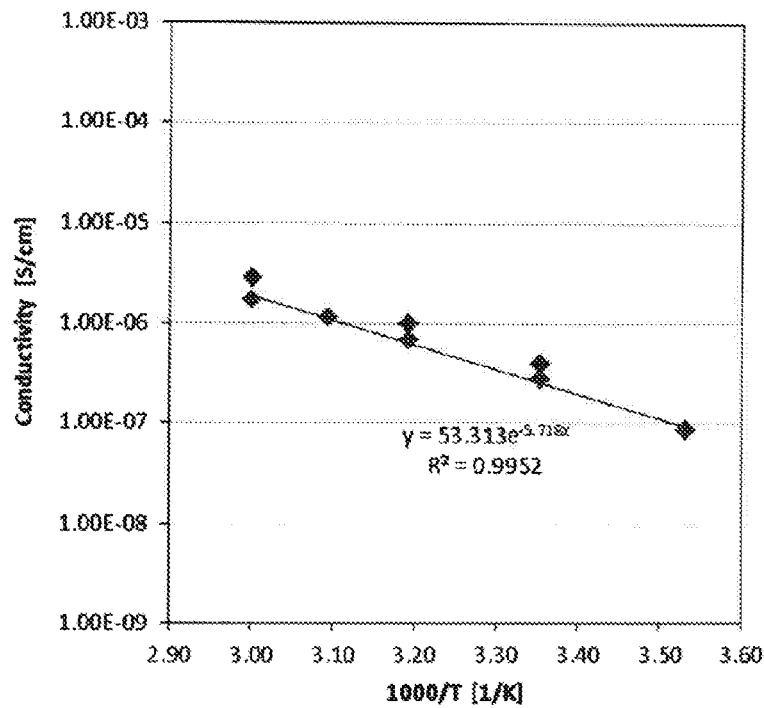
FIG. 1 is an Arrhenius plot showing the conductivity of the magnesium boron cluster mixture: $Mg(diglyme)B_{12}H_{12}$, $Mg(diglyme)B_{11}H_{11}$, and $Mg(diglyme)B_{11}H_{14}$.

The present disclosure provides a magnesium electrochemical cell having a solid electrolyte, and a method for making the same. The solid electrolyte utilizes any of a number of magnesium salts that has excellent anodic compatibility with magnesium metal, including high coulombic efficiency across a substantial electric potential window for many charge-discharge cycles. Due to the exclusion of solvent in liquid form, the solid electrolyte possesses excellent physicochemical stability, including an absence of volatility, as well as appreciable energy density. Further, it has been discovered that the solid electrolyte made in accordance with the present teachings has the highest conductivity as compared to known solid magnesium electrolyte.

The solid electrolyte, as employed in the presently disclosed electrochemical cell and method for making the same, generally includes cationic magnesium and a boron cluster anion, the magnesium can optionally be coordinated by at least one ether (in some instances a multidentate ether) or other weakly coordinating ligand. The solid electrolyte, such as those produced within the context of the presently disclosed method, remains solid up to temperatures higher than any typical magnesium battery operating temperature, and thus will be produced and used as a solid-phase magnesium electrolyte for a magnesium battery. The solid electrolyte of the present disclosure possesses magnesium mobility which makes it appropriate for use as magnesium electrolyte.

Accordingly, provided herein is an electrochemical cell that includes an anode; a cathode; and a solid electrolyte in contact with at least one of the anode and the cathode. In general, the solid electrolyte will contain a salt having at least one magnesium cation ($Mg^{2+}$) and at least boron cluster anion per stoichiometric unit. In some instances, the solid electrolyte will comprise a magnesium boron cluster salt having a formula of:

$$MgE_y(B_nH_n),\qquad\text{Formula I:}$$

$$MgE_y[B_mH_{(m+3)}]_2, \text{ or}\qquad\text{Formula II:}$$

a combination thereof, wherein E is a magnesium ligand; y is within a range of 0 through 6, inclusive; n is within a range of 6 through 12, inclusive; and m is within a range of 5 through 11, inclusive. It is to be appreciated that the solid electrolyte can optionally include multiple species selected from Formula I, Formula II, or both.

The terms "solid electrolyte" and "solid-phase electrolyte", as used herein, generally conform to the standard meaning of the term "solid", as opposed to liquid, gas, solution, etc. In some aspects, a solid electrolyte can be an electrolyte in which neither magnesium cations nor boron cluster anions undergo bulk Brownian motion. In some aspects, a solid electrolyte can be an electrolyte in which boron cluster anions undergo neither bulk Brownian motion nor bulk movement directed by an electric field. In some aspects, a solid electrolyte can be an electrolyte having substantially crystalline bulk morphology or is amorphous.

It will be appreciated that a magnesium boron cluster salt of Formula I generally includes a closo-borate anion having a formal charge of −2. Non-limiting examples of such closo-borate anions include $(B_{10}H_{10})^{2-}$, $(B_{11}H_{11})^{2-}$, and $(B_{12}H_{12})^{2-}$. It will equally be appreciated that a magnesium boron cluster salt of Formula II generally includes a nido-borate anion having a formal charge of −1. Non-limiting examples of such nido-borate anions include $(B_{11}H_{14})^-$.

In some implementations in which the magnesium ligand, E, of Formulae I and II is present (i.e. where y is greater than zero), the magnesium ligand will be an ether, preferably a multidentate ether. Non limiting examples include tetrahydrofuran (THF), 1,2-dimethoxyethane (glyme), bis(2-methoxyethyl) ether (diglyme), triethylene glycol dimethyl ether (triglyme), tetraethylene glycol dimethyl ether (tetraglyme), a polyethylene glycol dimethyl ether, and a poly(ethyleneoxide). It is to be appreciated that, while Formulae I and II suggest the presence of a single species of magnesium ligand, in different variations the magnesium ligand, when present, can include any of: a combination of different ethers; one or more non-ethers, and a combination of ethers and non-ethers.

Solid electrolytes of the present disclosure possess magnesium mobility, as determined from conductivity measurements. It can be stated as a general approximation that, in order to be effective in an electrochemical cell, a solid magnesium electrolyte should possess conductivity of at least $10^{-6}$ milliSiemens per centimeter (mS/cm).

FIG. 1 shows an Arrhenius plot, having conductivity plotted logarithmically vs. inverse temperature, for a solid electrolyte including a mixture of $Mg(diglyme)B_{12}H_{12}$, $Mg(diglyme)B_{11}H_{11}$, and $Mg(diglyme)B_{11}H_{11}$. As shown in FIG. 1, the exemplary solid electrolyte has a conductivity of $\sim 10^{-4}$ mS/cm at 25° C. and $\sim 10^{-3}$ mS/cm at 60° C. As previous magnesium solid electrolytes require a temperature of 150° C. to achieve $10^{-3}$ mS/cm, this result represents a 60% decrease in the required operating temperature to achieve a desirable conductivity.

Figure 2:
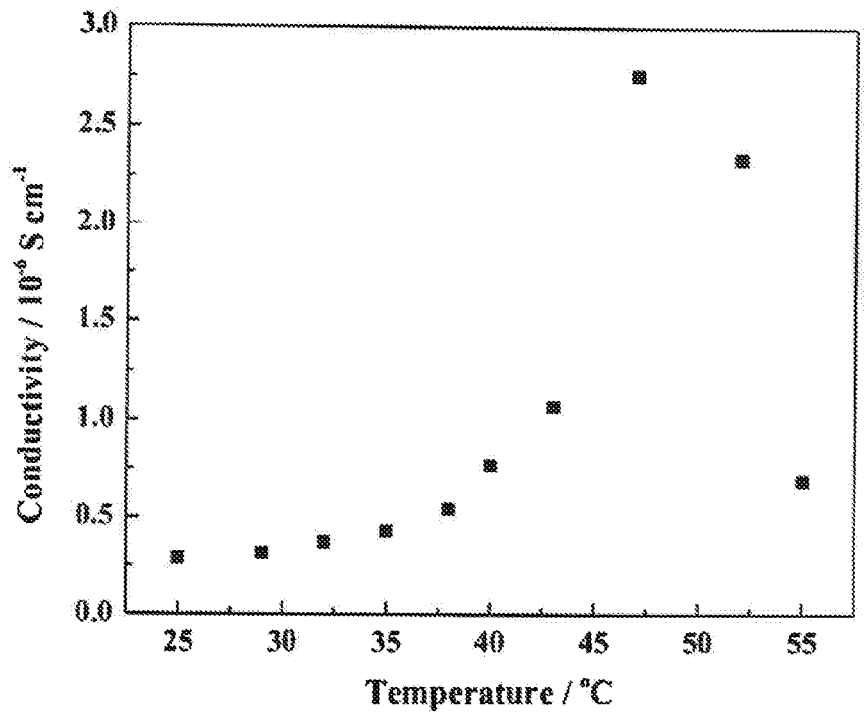
FIG. 2 is a plot of conductivity of the magnesium boron cluster $Mg(diglyme)B_{12}H_{12}$ as a function of temperature.
Figure 3:
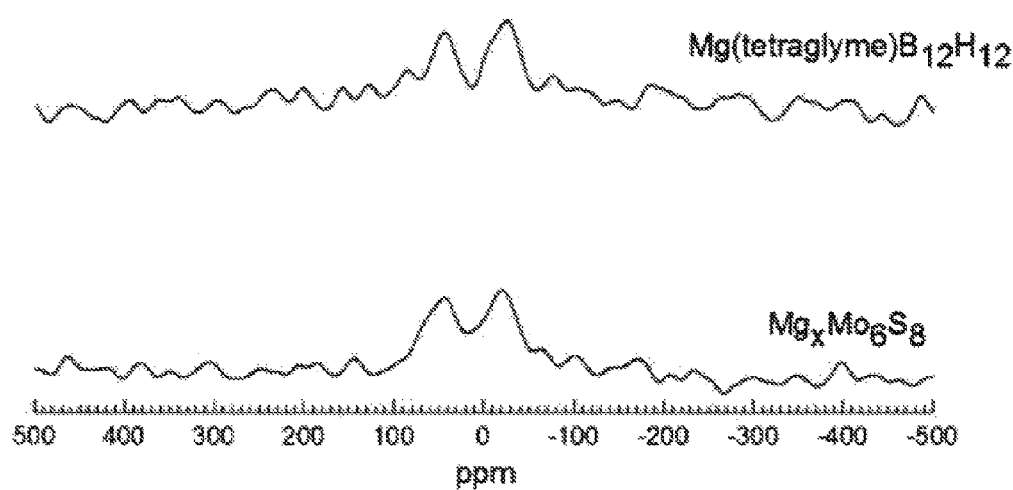
FIG. 3 shows Magic Angle Spinning Nuclear Magnetic Resonance (MAS-NMR) $^{25}Mg$ spectra of $Mg(tetraglyme)B_{12}H_{12}$, with a comparison to Chevrel phase $MgMo_6S_8$ as a reference spectrum.

FIG. 2 shows conductivity as a function of temperature for a solid-phase electrolyte having $Mg(diglyme)B_{12}H_{12}$. As shown in FIG. 2, this exemplary solid-phase electrolyte achieves conductivity of $10^{-3}$ mS/cm at 45° C., representing a 70% reduction in required operating temperature relative to previous magnesium solid-phase electrolytes. Referring now to FIG. 3, magic angle spinning nuclear magnetic resonance (MAS-NMR) experiments was performed to further support the finding of high magnesium cation mobility within the disclosed solid-phase electrolyte. Chevrel phase $Mg_xMo_6S_8$, a common magnesium cathode material, was examined as an exemplary high-conductivity material.

Due to the large nuclear quadrupole couplings, the line-widths of $^{25}Mg$ resonances are normally in the range of MHz. In FIG. 3, narrow line-widths in the range of kHz with the magnesiated Chevrel phase $Mg_xMo_6S_8$, and $Mg(tetraglyme)B_{12}H_{12}$, which indicate the hopping frequency mobility of the magnesium cations within the lattices. In addition, relaxation time of less than one second was required in the T1 measurements for these samples, thus again supporting a high mobility of the Mg cation in $Mg(tetraglyme)B_{12}H_{12}$.

An electrochemical cell according to the present disclosure and having a solid-phase electrolyte that includes a magnesium boron cluster salt will, in many implementations, be a magnesium battery wherein a reduction/oxidation reaction according to the following reaction occurs in at least one half-cell:

$$Mg^0 \rightleftharpoons Mg^{2+}+2e^-$$

In many implementations, the electrochemical cell will be a secondary battery or a subunit of a secondary battery. In such implementations, it is to be understood that the term "anode" as used herein refers to an electrode at which magnesium oxidation occurs during device discharge and at which magnesium reduction occurs during device charge. Similarly, it is to be understood that the term "cathode" refers in such implementations to an electrode at which a cathode material reduction occurs during device discharge and at which a cathode material oxidation occurs during device charge.

In such implementations, the anode can comprise any material or combination of materials effective to participate in electrochemical oxidation of magnesium during a device discharge. Similarly, the anode can comprise any material or combination of materials effective to participate in electrochemical reduction of magnesium cations and to incorporate reduced magnesium during a device charging event. In some implementations, the anode can consist essentially of elemental magnesium (i.e. magnesium atoms having no formal charge) or comprise at least one surface layer of elemental magnesium. In other implementations, the anode can comprise a magnesium-containing alloy and/or an insertion-type magnesium electrode such as a tin or bismuth electrode, containing magnesium in complex or alloy with other materials to the extent the cell is charged.

The cathode can comprise any material or combination of materials effective to participate in electrochemical insertion of a cathode material during a device discharge. Similarly, the cathode can comprise any material or combination of materials effective to participate in electrochemical extraction of said cathode material during a device charging event. In some variations, the cathode material which is inserted at the cathode during a device discharge and extracted from the cathode during device charging event can comprise magnesium. Suitable but non-exclusive examples of cathode materials can include a Chevrel phase molybdenum composition such as $Mo_6S_8$, $FeSiO_4$ (reversibly $MgFeSiO_4$), $MnO_2$, $MgFePO_4$, sulfur, organosulfur compounds, an organic cathode materials such as poly(2,2,6,6-tetramethyl-piperidinyl-1-oxy-4-yl methacrylate) (PTMA), air, or any other suitable materials.

The electrochemical cell can additionally include at least one external conductor, configured to enable electrical communication between the anode and the cathode. In a simple implementation, the at least one external conductor can be a single conductor such as a wire connected at one end to the anode and at an opposite end to the cathode. In other implementations, the at least one external conductor can include a plurality of conductors putting the anode and the cathode in electrical communication with a power supply device configured to apply an electric potential to the electrochemical cell during a charging event, with other electrical devices situated to receive power from the electrochemical cell, or both.

It is to be appreciated that an electrochemical cell of the present disclosure will include at least one electrochemical half-cell that includes an electrode and a solid-phase electrolyte in ionic communication with the electrode. The solid-phase electrolyte is as described above, and the electrode can be any electrode configured to incorporate elemental magnesium during an electrochemical reduction, to release cationic magnesium during an electrochemical oxidation, or both. In general, the electrode of the electrochemical half-cell can be either an anode or a cathode as described above, including any of the anode or cathode materials described above as non-limiting examples.

Figure 4:
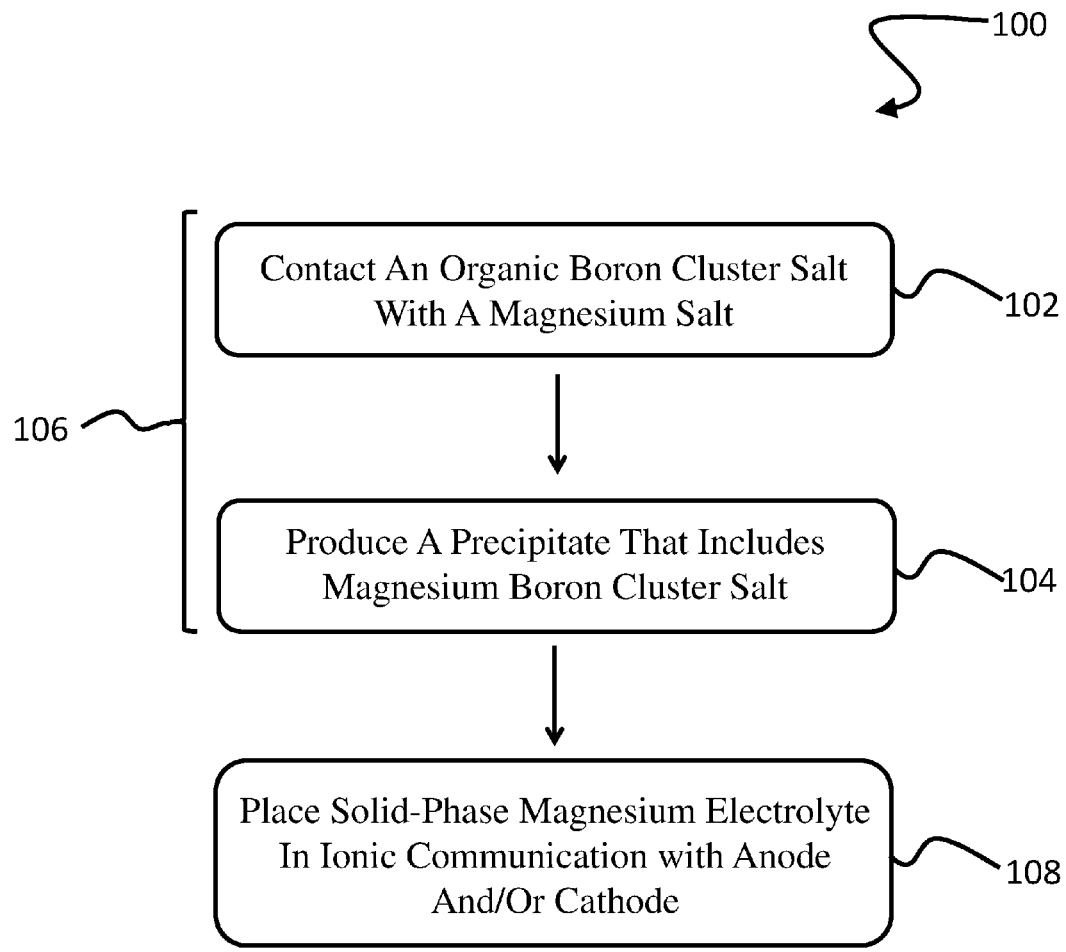
FIG. 4 is a flow-chart of a method for fabricating an electrochemical cell.

Also provided herein, and with reference to FIG. 4, is a method 100 for preparing an electrochemical cell. The method 100 includes a step 108 of placing a solid-phase magnesium electrolyte in ionic communication with at least one of an anode and a cathode. The solid-phase magnesium electrolyte will generally be of the type described above. The method 100 can additionally include a step 106 of preparing a solid-phase magnesium electrolyte of the type described above. In some variations, the preparing step 106 can be performed by a process that includes a step 102 of contacting an organic boron cluster salt with a magnesium salt. In many instances, the contacting step will be performed in the presence of an ethereal solvent. The process for performing the preparing step 106 can further include a step 104 of producing a precipitate. The precipitate produced by step 104 includes a magnesium boron cluster salt, of the type described above.

In some variations, the precipitate produced by performance of step 104 can be directly used as the solid-phase magnesium electrolyte in step 108. In other variations, the precipitate can be subjected to additional purification and/or processing steps prior to use as the solid-phase magnesium electrolyte of step 108. For example, magnesium boron cluster salt included in the precipitate can be purified, such as by solvent extraction. The magnesium boron cluster salt can also or alternatively be mixed with an electrochemically inactive binder, such as polyvinylidene fluoride, polytetrafluoroethylene, styrene butadiene rubber, and/or polyimide.

It is to be appreciated that all ranges described in the present disclosure are intended as being inclusive of the endpoints. For example, a value described as being "within a range of X through Y" can include the values X, Y, and values intermediate to X an Y.

Various aspects of the present disclosure are further illustrated with respect to the following Examples. It is to be understood that these Examples are provided to illustrate specific embodiments of the present disclosure and should not be construed as limiting the scope of the present disclosure in or to any particular aspect.

Example 1. Electrolyte Synthesis

Preparation of magnesium dodecaborate tetraglyme dichloromethane solvate: a solution of bis(tetrabutylammonium) dodecaborate (1.0 g, 1.6 mmol) in anhydrous $CH_2Cl_2$ (40 mL) is added anhydrous tetraglyme (40 mL) and set aside. This is termed "Solution 1". In a separate container, a solution of magnesium bis(trifluoromethanesulfonimide) (932 mg, 1.6 mmol) in anhydrous tetraglyme (40 mL) is added to anhydrous $CH_2Cl_2$ (40 mL). This is termed "Solution 2". Solution 2 is immediately added to Solution 1. After 5 minutes stirring at room temperature, a white solid precipitates out, resulting in a suspension. The suspension is stirred for 24 hours and filtered. The solid is washed with anhydrous tetraglyme/$CH_2Cl_2$ (1:1) (5 mL+10 mL+5 mL), $CH_2Cl_2$ (2×5 mL), tetraglyme (2×5 mL) and $Et_2O$ (3×5 mL). The washed solid is dried under vacuum to obtain 849 mg of a white solid.

Example 2. Ionic Conductivity Measurements

About 50 mg of the solid from Example 1 is pressed between two gold electrodes. The temperature is slowly elevated and the conductivity is recorded. The result shown in FIG. 2 shows the ionic conductivity of the magnesium cations function of the temperature.

The foregoing description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure; various steps may be performed independently or at the same time unless otherwise noted. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment is included in at least one embodiment or aspect. The appearances of the phrase "in one aspect" (or variations thereof) are not necessarily referring to the same aspect or embodiment.

While particular embodiments have been described, alternatives, modifications, variations, improvements, and substantial equivalents that are or may be presently unforeseen may arise to applicants or others skilled in the art. Accordingly, the appended claims as filed and as they may be amended, are intended to embrace all such alternatives, modifications variations, improvements, and substantial equivalents.

What is claimed is:

1. An electrochemical cell, comprising:
    an anode comprising magnesium;
    a cathode; and
    a solid electrolyte in contact with at least one of the anode and the cathode, the solid electrolyte including a boron cluster salt having a formula:

$MgE_y(B_nH_n)$, $MgE_y[B_mH_{(m+3)}]_2$, or a combination thereof, wherein E is a magnesium ligand; y is within a range of 0 through 6, inclusive; n is within a range of 6 through 12, inclusive; and m is within a range of 5 through 11, inclusive.

2. The electrochemical cell as recited in claim 1, wherein y is within a range of 1 through 6, inclusive.

3. The electrochemical cell as recited in claim 2, wherein E is an ether.

4. The electrochemical cell as recited in claim 3, wherein E is any of monoglyme, diglyme, triglyme, tetraglyme, polyethylene glycol dimethyl ether, a poly(ethyleneoxide), and a combination thereof.

5. The electrochemical cell as recited in claim 1, wherein the boron cluster salt is any of $MgE_y(B_{10}H_{10})$, $MgE_y(B_{12}H_{12})$, $MgE_y(B_{11}H_{14})_2$, and a combination thereof.

6. A method for fabricating an electrochemical cell, the method comprising:
    preparing a magnesium boron cluster salt by a process that includes:
        contacting an organic boron cluster salt with a magnesium salt in the presence of a weakly magnesium coordinating solvent; and
        producing a precipitate that comprises the magnesium boron cluster salt, the magnesium boron cluster salt having a formula:

$MgE_y(B_nH_n)$, $MgE_y[B_mH_{(m+3)}]_2$, or a combination thereof, wherein E is a magnesium ligand; y is within a range of 0 through 6, inclusive; n is within a range of 6 through 12, inclusive; and m is within a range of 5 through 11, inclusive; and
    placing the magnesium boron cluster salt in ionic communication with an anode and a cathode.

7. The method as recited in claim 6, wherein y is within a range of 1 through 6, inclusive.

8. The method as recited in claim 7, wherein E is an ether.

9. The method as recited in claim 8, wherein E is any of monoglyme, diglyme, triglyme, tetraglyme, polyethylene glycol dimethyl ether, a poly(ethyleneoxide), and a combination thereof.

10. The method as recited in claim 6, wherein the magnesium boron cluster salt is any of $MgE_y(B_{10}H_{10})$, $MgE_y(B_{12}H_{12})$, $MgE_y(B_{11}H_{14})_2$, and a combination thereof.

11. An electrochemical half-cell comprising:
    an electrode configured to incorporate elemental magnesium during electrochemical reduction, to release cationic magnesium during electrochemical oxidation, or both; and
    a solid-phase magnesium electrolyte in ionic communication with the electrode, the solid-phase magnesium electrolyte comprising cationic magnesium and at least one boron cluster anion including a boron cluster salt having a formula:

$MgE_y(B_nH_n)$, $MgE_y[B_mH_{(m+3)}]_2$, or a combination thereof, wherein E is a magnesium ligand; y is within a range of 0 through 6, inclusive; n is within a range of 6 through 12, inclusive; and m is within a range of 5 through 11, inclusive.

12. The electrochemical half-cell as recited in claim 11, wherein the solid-phase magnesium electrolyte is substantially crystalline.

* * * * *

UNITED STATES PATENT AND TRADEMARK OFFICE
CERTIFICATE OF CORRECTION

PATENT NO. : 9,716,289 B1
APPLICATION NO. : 15/332684
DATED : July 25, 2017
INVENTOR(S) : Fuminori Mizuno et al.

Page 1 of 1

It is certified that error appears in the above-identified patent and that said Letters Patent is hereby corrected as shown below:

In the Specification

Column 4, Lines 48/49, "$MG^0 \rightleftharpoons Mg^{2+} + 2e^-$" should be -- $Mg^0 \rightleftharpoons Mg^{2+} + 2e^-$ --

In the Claims

Column 8, Lines 2-3, "$MgE_y(B_{10}H_{10})$, $MgE_y(B_{12}H_{12})$" should be -- $MgE_y(B_{10}H_{10})$, $MgE_y(B_{11}H_{11})$, $MgE_y(B_{12}H_{12})$ --

Column 8, Lines 33-34, "$MgE_y(B_{10}H_{10})$, $MgE_y(B_{12}H_{12})$" should be -- $MgE_y(B_{10}H_{10})$, $MgE_y(B_{11}H_{11})$, $MgE_y(B_{12}H_{12})$ --

Column 8, Lines 42-43, "electrolyte comprising cationic magnesium and at least one boron cluster anion including a boron cluster salt" should be -- electrolyte comprising a boron cluster salt --

Signed and Sealed this
Twenty-seventh Day of February, 2018

Andrei Iancu
*Director of the United States Patent and Trademark Office*